United States Patent [19]
Pirie

[11] Patent Number: 5,247,489
[45] Date of Patent: Sep. 21, 1993

[54] DIGITAL RANGE MEASUREMENT SYSTEM
[75] Inventor: David M. Pirie, Norwich, Conn.
[73] Assignee: The United States of America as represented by the Secretary of the Navy, Washington, D.C.
[21] Appl. No.: 955,798
[22] Filed: Oct. 2, 1992
[51] Int. Cl.⁵ .............................................. G01S 15/00
[52] U.S. Cl. ............................................... 367/127
[58] Field of Search .............. 367/118, 127, 129, 131, 367/907, 6; 364/561

[56] References Cited
U.S. PATENT DOCUMENTS 4,513,401 4/1985 Ottsen et al. ............................ 367/6
4,516,226 5/1985 Peynaud et al. .................... 367/127

Primary Examiner—Daniel T. Pihulic
Attorney, Agent, or Firm—Michael J. McGowan; Prithvi C. Lall; Michael F. Oglo

[57] ABSTRACT

A digital range measuring system utilizes a digital signal processing processor in connection with a precision time standard to generate a unique, characterizing frequency signal for transmission through a medium such as a body of water, at precisely known time intervals wherein a received signal at a second, different DRMS performs a predetermined number of frequency domain analyzations on the received signal to detect the presence of a known, unique frequency signal representative of at least one originating DRMS. Each of the frequency domain analyzations are time identified so that the one frequency domain analyzation during which the presence of the known frequency is detected is used to determine the time of detection. A personal computer is coupled to the digital signal processing processor and uses the time of detection in calculating the range between the receiver and the originating transmission.

5 Claims, 3 Drawing Sheets

DIGITAL RANGE MEASUREMENT SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to range measurement systems (RMS) for determining the relative distance between two or more undersea and surface vessels and deals more particularly with a digital range measurement system (DRMS) to acoustically measure and record the ranges between undersea and surface vessels by measuring sound propagation delay through the ocean by using digital signal processing (DSP) techniques to determine the frequency of a detected signal at a predetermined time to identify the source and the range to the source at the time of detection.

(2) Description of the Prior Art There are numerous naval and oceanic related exercises or projects involving Sonar at sea testing with two or more submarines or surface ships which are concerned with the relative distances between test platforms during the exercise. There is no measurement device independent of the test platform's Sonar system which can provide the desired range information. Therefore when testing the performance of the ship's Sonar or tracking capability, test personnel have no basis other than the test plan to compare range predictions with and to determine the overall test results accuracy.

Prior to the present invention, such distances were determined using a range measurement system (RMS). The known RMS experiences a number of shortcomings among which are limitations in its detection capabilities and lack of flexibility to accommodate the varying test requirements. Another serious drawback of the known RMS is that the detection circuit is implemented completely with hardware and comprises three phase-locked loop circuits which are permanently tuned to accept three specific, given frequencies. Inherent in this design is the lack of flexibility to change any one or all of the detect frequencies. Furthermore, the known RMS suffers in its capability to extract and detect vary low level signals which could be Doppler shifted in frequency such that the RMS fails to detect and operate directly in many common long range exercises.

As known, conventional Sonar systems typically depend upon a return pulse which is transmitted to and reflected from another vessel or object so that return signal is received at the point of origination.

U.S. Pat. No. 4,513,401 issued to Ottsen et al on Apr. 23, 1985 describes a marine cable locating system wherein a plurality of acoustic transponders are placed at spaced intervals along cable with each transponder transmitting an acoustic signal at a unique characteristic frequency so that the precise location of each transponder can be accurately determined from slant range measurements as the vessel follows a parallel path and from water depth measurements as the vessel crisscrosses the cable. Each transponder is interrogated from a unit on the vessel and transmits an acoustic signal in response thereto at each time the transponder is interrogated from which a set of loci is plotted for all possible positions in order to identify the exact position of the transponder.

Pat. No. 4,516,226 issued to Peynaud et al on May 7, 1985 discloses an acoustic positioning system wherein an interrogator and a number of transponders are moored to the seabed in known positions to define a fixed reference system. The interrogator transmits a first frequency signal which in turn causes each of the transponders to transmit a unique associated frequency signal in response thereto. The acoustic frequency signal from the interrogator and from the transponders are received by an acoustic array located at the vessel for which it is desired to positionally determine the coordinates X and Y of the vessel within the fixed reference system. The location is determined by utilizing the transit time of the signal from the interrogator and the transit time of the signal from the transponder which is transmitted in response to the interrogation signal. The time that the interrogator transmits its signal is also transmitted to the surface vessel for use in determining its position in the case of an undersea vessel, it is contemplated that the time of the periodic transmissions by the interrogator are synchronized with an onboard clock so that the time of transmission is known. This patent discloses that transmission of acoustic pulse can be made from a source known geographically (triangulation is used to determine the X, Y coordinate of the vessel within the fixed reference system).

Neither the prior art nor the known range measuring systems disclose the concept of transmitting a characteristic, unique frequency signal at a predetermined time synchronized relative to a real-time clock whereby the time detection delay is used to determine the range or distance between two or more vessels without the need of transponders which are in a known position defining a fixed reference system.

The DRMS employing the present invention overcomes the known problems with RMS by implementing the detection and transmission process with software rather than hardware as previously done. The implementation of the digital range measuring system utilizing software algorithms inherently provides greater flexibility over hardware implementation since changing the detection and transmission frequency requires only certain program variables to be changed. The DRMS also provides the ability of a user to set the detection and transmission frequency in real time. The DRMS of the present invention utilizes a state of the art digital signal processing processor with dedicated programming which runs concurrently with the software of a personal computer to perform the detection of a signal with a known predetermined frequency and transmission functions as explained in further detail hereinbelow. The process of detection with the DRMS of the present invention provides a more accurate and reliable detecting of incoming signals with varying Doppler shifts and very low level signals.

SUMMARY OF THE INVENTION

In accordance with the present invention, a digital range measuring system (DRMS) utilizes a digital signal processing processor for generating and initiating the transmission of a unique, characterizing frequency acoustic wave signal from a vessel at a predetermined, precisely known real time. The acoustic wave is received at a second DRMS wherein the received acoustic signal is converted to an analog electric signal where it is conditioned and sampled for conversion to a digitally encoded word. A digital signal processing processor performs a predetermined number of frequency domain analyzations of the signal to detect the presence of the predetermined frequency associated with the identification of the originating vessel of the transmitted acoustic wave. Each of the frequency domain analyzations are time identified so that if it is determined that a detection is made, the one frequency domain analyzation during which the detection is made is identified and its time of detection is extracted and utilized by the personal computer in the calculation of the distance between the receiver and the originating transmission.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
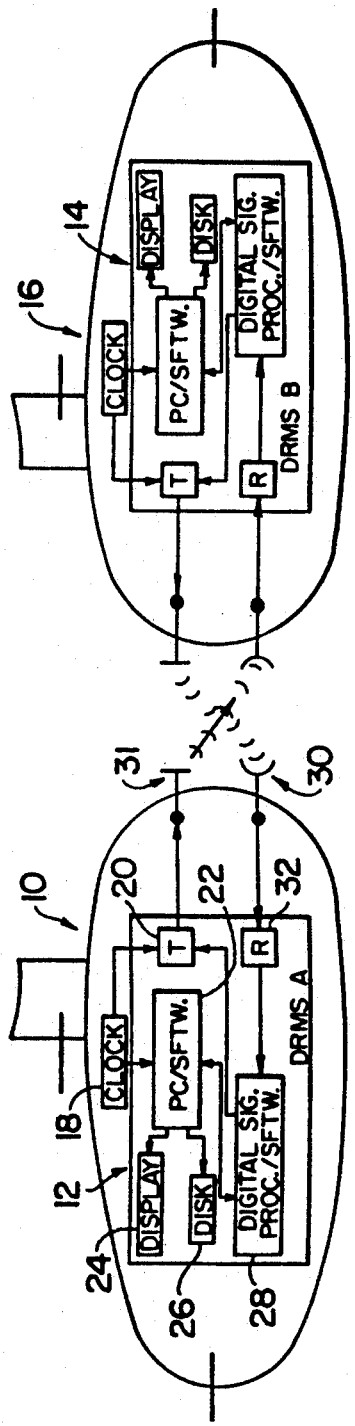
FIG. 1 is a functional block diagram of the DRMS illustrated aboard a submarine.

Turning now to FIG. 1 and considering the digital range measurement system (DRMS) of the present invention in further detail, a somewhat schematic, functional block diagram of the DRMS is illustrated as it might be used aboard a vessel such as a submarine. In FIG. 1, a first submarine 10 includes a DRMS generally designated 12 which detects and computes the one-way propagation time of a pulse generated by a second DRMS generally designated 14 and located on a test or target ship such as the submarine generally designated 16. In normal operation, the DRMS is used during at sea testing involving two or more surface ships or submarines and each vessel participating in the exercise is equipped with a DRMS. The DRMS 12 located on the submarine 10 is essentially identical to the DRMS 14 located on the submarine 16 except that each DRMS transmits a pulse signal at a unique, characteristic frequency. In all other respects, the functional block diagram subcomponents of the DRMS 12 are identical to the functional block diagram components of the DRMS 14 and therefore like reference numerals refer to like parts.

Turning to the DRMS 12, it is contemplated that the vessel's precision time standard or clock 18 provide precise timing signals to the transmitter 20 and the personal computer 22 and its respective software as explained in further detail below. The personal computer (PC) 22 has outputs to a graphical display 24 and to a hard disk drive 26 wherein the display and disk drive operate in a manner well known to those skilled in the art. The PC 22 further interfaces with digital signal processing processor generally designated 28 which interfaces with the personal computer and includes an instruction set in accordance with the necessary software programming as described in further detail below to determine if a signal received by the hydrophone 30 and receiver 32 is of the signal frequency expected from the DRMS 14 located on the submarine 16. The digital signal processing processor 28 is further coupled to the transmitter 20 to cause the transmitter to transmit a pulse via the transducer 31 at the predefined time as further explained below.

The components comprising the DRMS are generally commercially available wherein the PC 22 is contemplated to be an IBM PC/AT compatible personal computer having a standard display and hard disk drive. It is contemplated that the digital signal processor card containing the digital signal processing processor 28 is located in the card slots within the computer and typically is commercially available as Model ADSP-2100 digital signal processor card manufactured by Spectrum Processing Inc. of Waltham, Mass. The transmitter 20 and receiver 32 are custom designed devices however, it is sufficient for purposes of this disclosure to note that the transmitter and receiver are of such a design to be compatible with and operable with the hydrophone 30 and transducer 31. It is further contemplated that the DRMS may be portable, being installed aboard the test vessel prior to a test exercise and removed at the completion of the test exercise.

The basic sequence of events for range determination between the two DRMS units illustrated in FIG. 1 are explained as follows. An acoustic wave or ping transmission of a given and known characteristic frequency associated with the DRMS 14 of the submarine 16 is detected as an incoming ping by the DRMS unit 12 of submarine 10. The time of detection of the incoming ping is determined from the clock 18 which is synchronized to the submarine high precision time standard which is generally accurate to at least 10-6 seconds. The range is then calculated based on the one-way propagation time of the incoming ping and the sound velocity for speed of sound in water for the location of the submarine and which sound velocity is entered by the user. The calculated result is displayed as a range value on the DRMS display screen and a plot of the range is also displayed. The range information along with the detection date and time is subsequently stored on the hard disk drive of the PC 22.

Figure 2:
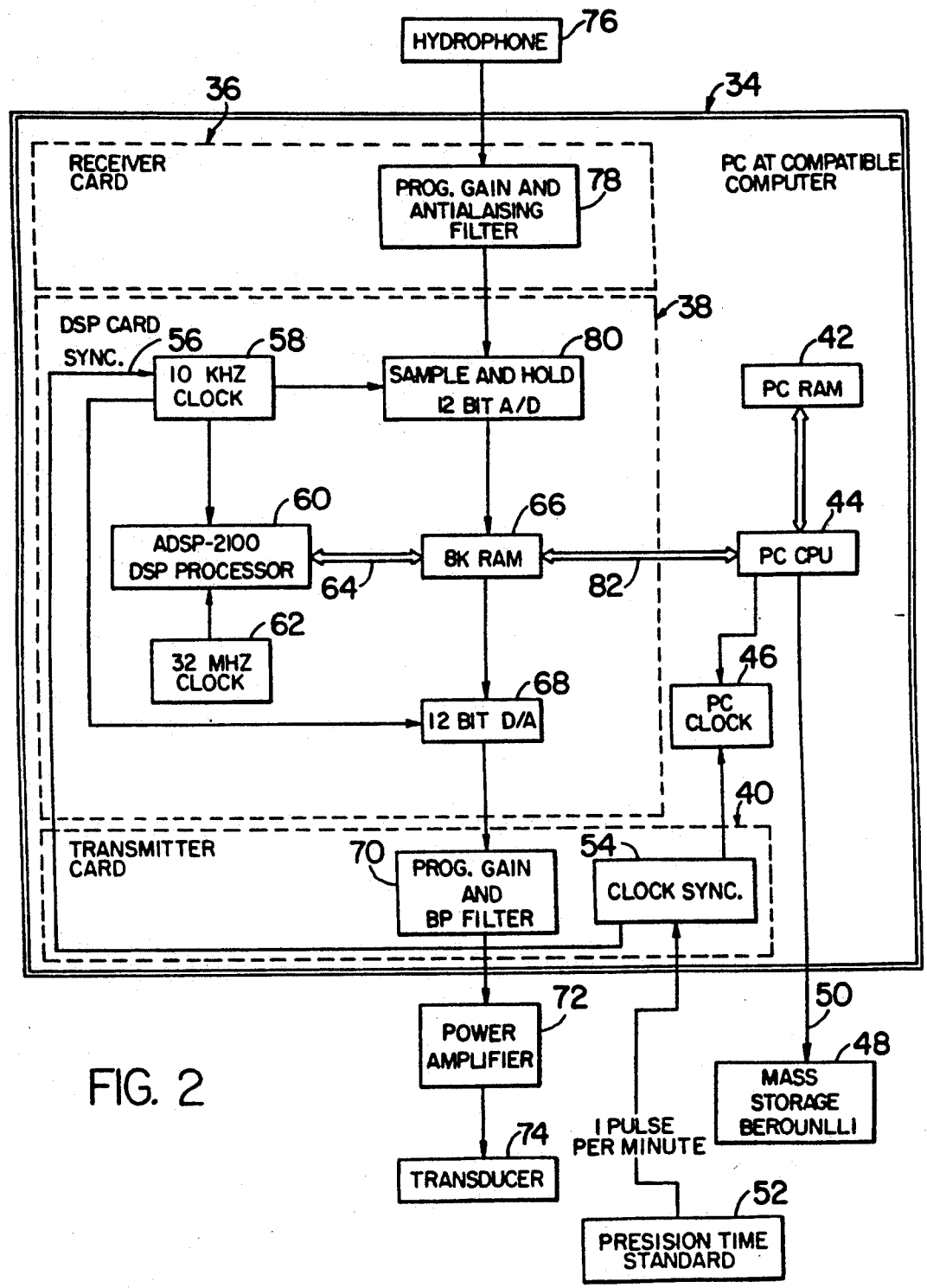
FIG. 2 is a detailed functional block diagram of the DRMS.

Turning to FIG. 2, a somewhat more detailed functional block diagram of the DRMS of the present invention is illustrated with the personal computer or PC being shown within the function block 34. Within the PC 34 located within the PC's bus connectors is a receiver card 36, a digital signal processor card 38, and a transmitter card 40. The PC 34 is configured in a conventional arrangement and includes RAM memory 42, central processing unit (CPU) 44 and an internal PC clock 46. In the block diagram illustration of FIG. 2, the PC is illustrated as having an external mass storage device, such as a Bernounlli box 48 connected to the CPU 44 in a well known manner by cable 50.

The DRMS operates in conjunction with a precision time standard on board the vessel and which precision time standard may be a clock, or other suitable precision timing device having an accuracy in the range of 10-6 seconds or other acceptable standard. The precision time standard 52 generates one pulse per minute which is coupled to the clock synchronization circuit 54 located on the transmitter card 40. The output of the clock synchronization circuit is coupled to the internal PC clock 46 and also to the synchronization input 56 of the internal 10 kilohertz clock 58 located on the digital signal processor card 38. The selection of one pulse per minute from the precision time standard 52 is set so that all the setup, range, and timing information is stored to the hard disk or Bernounlli storage device 48, once per minute during the exercise so that the collected data can be reconstructed during pulse test analysis. Obviously, other time intervals could be utilized with like results.

The digital signal processor card 38 includes a digital signal processing (DSP) processor 60 and in the present embodiment is identified as an ADSP-2100 integrated circuit device made by Analog Devices Inc. of Norwood, Massachusetts. A DSP processor is in actuality a microprocessor optimized for digital processing, that is, it is optimized for algorithmic and vector processing. DSP processors offer advantages over other known microprocessors and microcontrollers due to their high speed hardware multipliers and fast on-chip memories which eliminate the delay generally associated with conventional data input/output functions. The use of a DSP processor in the DRMS of the present invention minimizes hardware component counts and permits the rapid execution of the DRMS algorithm explained in further detail below. Additionally, the use of a DSP processor in the DRMS of the present invention greatly enhances the speed of execution of the algorithm since general purpose microprocessors are generally an order of magnitude or more slower than the DSP processor since the instructions and data in a DSP processor move parallel rather than sequentially to enable instructions to be executed in a single cycle rather than in multiple cycles as would be expected in a microprocessor or other general purpose processor. In addition, the DSP processor provides a higher precision result than is possible with microcontrollers or microprocessors because the DSP processor does not rely on look-up tables to approximate the results of an intricate algorithms such as the algorithm explained below. In other words, a DSP processor provides the ability for real time calculations for analog like performance without the look-up tables generally associated with general purpose processors, microprocessors or microcontrollers.

Still referring to FIG. 2, a ping transmission is initiated by the DSP processor 60 at the precision time interval as defined through the algorithm instruction set programmed in the DSP processor and as derived from a precision time standard shown as a 32 megahertz clock 62 coupled to the DSP processor. The DSP processor generates a digital output on the bus 64 coupled to the RAM 66 located on the digital signal processor card 38. The output of the RAM 66 is coupled to the input of a digital-to-analog converter 68 which converts a digital signal generated by the DSP processor to an analog signal having the unique, characteristic frequency identifying the specific DRMS originating the ping transmission. The output of the digital-to-analog converter is further conditioned for transmission by means of the programmable gain and filtering circuitry located within the function block 70 on the transmitter card 40. The further conditioned analog signal is then coupled to an external power amplifier 72 which in turn drives the transducer 74 to produce the acoustic wave or ping transmission.

Still referring to FIG. 2, an incoming ping transmission from another DRMS is sensed by the hydrophone indicated generally by the function block 76. The sensed ping transmission is coupled to the receiver card 36 where the sensed signal is further conditioned through amplification and an anti-alaising filter and since the input frequency is theoretically unknown, the signal is passed through an anti-alaising filter as illustrated in the functional block diagram 78. The conditioned, received analog signal is sampled and converted to a digital signal by an analog-to-digital converter represented by the function block 80 on the digital signal processor card 38. The converted analog received signal is output as a digital signal to the RAM 66 and input via the bus 64 to the DSP processor 60. The detection algorithm instruction set programmed in the DSP processor detects the incoming ping and its frequency, and in the case of a legitimate detection, will be the unique characteristic frequency of a different DRMS. Upon detection by the detection algorithm as explained in further detail below, the DSP processor 60 signals the CPU 44 of the PC via the bus 64, RAM 66 and bus 82 coupling the RAM 66 to the CPU 44. The instruction set in the personal computer then calculates the time of detection and from the PC internal clock 46 determines the detect hour and minute. The ten kilohertz clock 58 located on the digital signal processor card 38 is used to determine the detect second, tenths and hundredths of seconds. As further described below, the range in yards to the source of the ping transmission is derived from the time of detection. The DRMS performs both the transmit and receive function continuously and simultaneously, that is, the generation of a ping transmission and the sensing and receipt of a ping transmission from a different DRMS.

Figure 3:
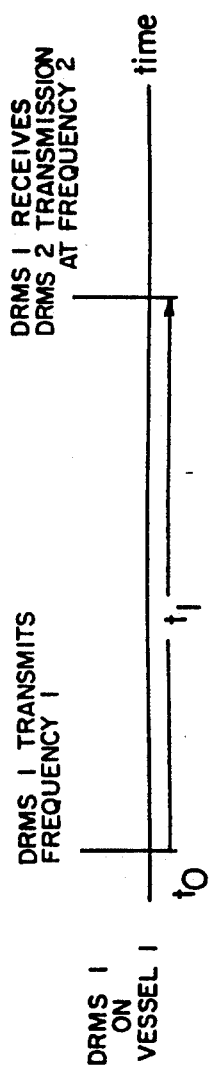
FIG. 3 is a time line diagram used to explain the principle of operation of the DRMS.

Turning now to FIG. 3, a time line diagram is illustrated for purposes of further explanation of the operation of the DRMS of the present invention. Recalling from above that all DRMS operate in the same timing mode, that is, each transmits a ping transmission at a precisely defined interval which is repeated continuously for all DRMS. The time interval may be for example at one minute cycles. Each DRMS, DRMS1 and DRMS2 in the example of FIG. 3, transmits its unique, characteristic frequency at time to which is based on the precision time standard on the vessel. DRMS1 and DRMS2 then "listen" for an incoming ping transmission from the other DRMS2 and DRMS 1, respectively. That is, DRMS1 receives the ping transmission from DRMS2 and DRMS2 receives ping transmission from DRMS1. When an incoming ping transmission is detected, the frequency of detection as determined from the algorithm in the DSP processor identifies the source vessel and, since both DRMS1 and DRMS 2 initiated a ping transmission at precisely the same time, the time of detection determines the delay which is used to determine the range to the source vessel. As illustrated in FIG. 3, t, and t2 represent the propagation delay of the acoustic ping transmission through the water separating the two vessels. It is seen therefore that t, and t2 are directly proportional to the range between the two vessels.

Figure 4:
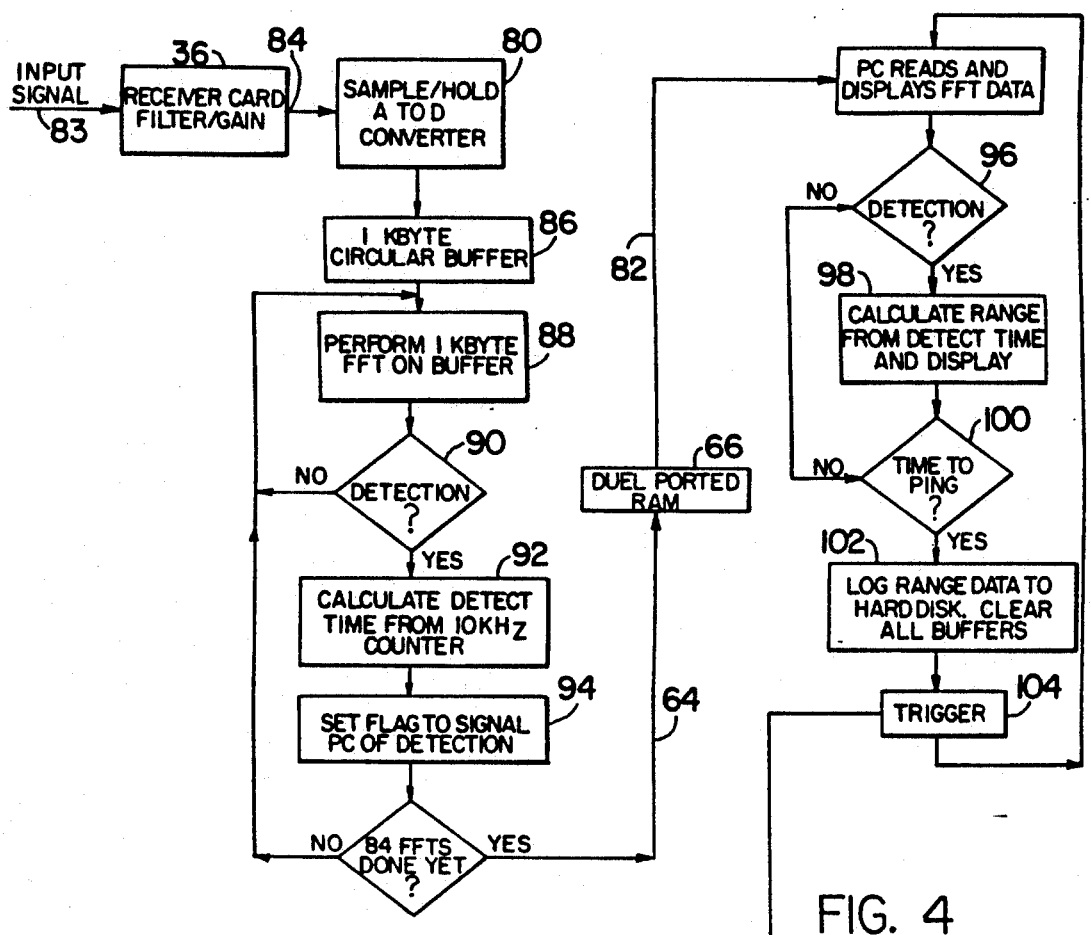
FIG. 4 is a flow chart representative of the instruction set used in the digital signal processing processor and the personal computer of the DRMS.
Figure 4:
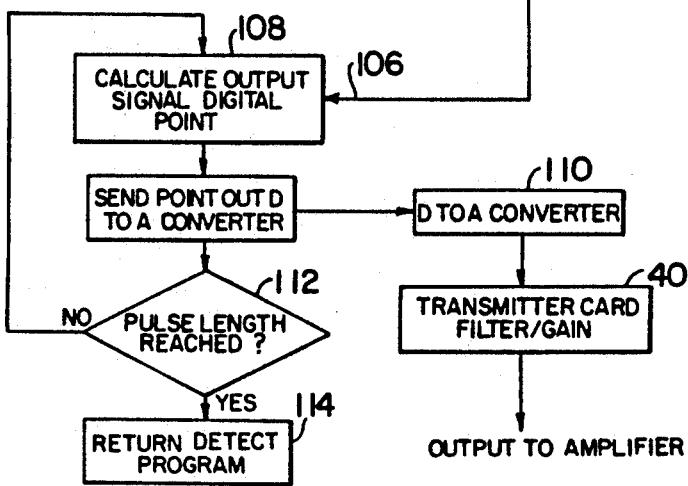

Turning now to FIG. 4, the DRMS instruction set used in the personal computer and the digital signal processing processor is represented by the flow chart shown therein and is described in conjunction with reference to FIG. 2. The flow chart of FIG. 4 represents the two programs, that of the DSP processor and the PC, respectively, to analyze incoming signals for detection, interface with a user and to store the system data. The programs provide the user with a friendly interface to the DRMS's control parameters via a keyboard and graphic display associated with the PC. The program also provides the user with real time information concerning the received and transmitted signals and displays numerical range information for incoming signals at their respective times of detection and a graphical display of range versus time for the previous 30 minutes or other collection period as determined by the software. A further feature of the program is to allow the DRMS to perform multiple detections on a single ping transmission for multi-path studies (that is, surface path and bottom bounce path).

The DRMS receives an incoming analog signal from the vessel's Sonar system at the input 83 to the receiver card shown by the function block 36 which filters and amplifies or attenuates the signal. The output 84 of the receiver card is sampled at a 10 kilohertz rate and converted to a digital signal via the analog-to-digital converter illustrated by the function block 80. The input signal is continuously digitized and stored in a one kilobyte circular buffer and the RAM of the digital signal processing processor on card 38. The instruction set in the DSP processor 60 continuously performs a one thousand twenty-four (1,024) point Fast Fourier Transform (FFT) on the digital information in the one kilobyte circular buffer. The FFT is represented by the function block 88. The FFT is performed at the rate of approximately one every five milliseconds. Each FFT is time tagged with a count which is incremented by the ten kilohertz timer and reset by the one pulse per minute signal from the vessel's precision time standard 52. This incremental count is used to determine the detection time as further described below. The output of each FFT is analyzed according to the instruction set of the DSP processor to determine if a detection has occurred and is represented by the function block 90. If a detection has not occurred, additional FFT's are performed until such time as a detection occurs. If the DSP processor determines that a detection has occurred, the FFT's are searched backwards in time to find the specific FFT in which the signal started in and uses the time tagged value of the FFT to calculate the detect second as represented by the function block 92 and to also set a flag for the FFT as represented by the function block 94 which will be used by the PC as an indication that a detection has been made. The algorithm of the DRMS requires that 64 overlapped FFT's be performed and if 64 FFT's are not performed the loop is incremented and a subsequent FFT is performed in the one kilobyte buffer 88 to repeat the process. At the completion of 64 FFT'S, the PC is signaled via the RAM 66 which is coupled to the DSP processor via the bus 64 and to the PC via the bus 82. At the completion of the block of 64 FFT'S, the PC reads the information and looks to see if the detect flag has been set. If the detect flag is determined to have been set via the detection block 96, it uses the detect second as determined in the DSP processor from the time tagged FFT to calculate the propagation delay incurred 16 by the received ping transmission. The instruction set in the PC then calculates the range from the detect time by multiplying the user entered sound velocity specifically identified for the water body through which the ping transmission is sent by the one-way propagation time and displays the range value on the PC's graphic display.

The PC also monitors when it is time to transmit a ping based on the DRMS's timing setting as indicated by the function block 100. If it is time to transmit a ping, the PC will write all range data to its hard disk or external mass storage device and clear all its buffers five seconds before the transmit time as indicated by the function block 102. At the transmit time, the PC via the function block 104 will send an interrupt signal to the DSP processor via the lead 106. The instruction set in the DSP processor now calculates the output ping transmission signal one point at a time as represented by the function block 108. The digital points corresponding to the output ping transmission signal are sent to the digital-to-analog converter represented by the function block 110 at a ten kilohertz rate. The output of the digital-to-analog converter is inputted to the DRMS's transmitter card 40 for conditioning prior to driving the external power amplifier which amplifies the signal to the maximum level that the output transducer is capable of handling for conversion to the acoustic signal transmission. Once the output digital signal is determined to be correctly generated as indicated by the function block 112, the DSP processor instruction set returns to running the detect program algorithm as illustrated by the function block 114.

In addition to storing the information associated with all detected pings received during the time interval between ping transmissions, any time that a system setting is altered by the user, the change and the time of the change is also stored to the PC's hard disk or external storage device. Furthermore, all DRMS automatically store all system setting to the hard disk once per hour for reliability and to insure that reconstruction of the data, should such reconstruction be necessary, be done under the specific settings of the system during which the data was collected.

It will be understood that numerous changes and modifications may be made to the digital range measuring system embodying the present invention by those skilled in the art in view of the above description in which the invention is described by way of illustration rather than limitation.

In light of the above, it is therefore understood that within the scope of the appended claims, the invention may be practiced otherwise than as specifically described.

What is claimed is:

1. A digital range measurement system (DRMS) comprising, in combination:

a surface or undersea vessel having a Sonar system including means for transmitting an acoustic wave and receiver means for sensing and converting an acoustic wave to a received electrical analog signal, a high precision real-time clock means, and means for transmitting said acoustic wave at a predetermined, known real-time;

means coupled to said receiver means for conditioning said received electrical analog signal;

means for sampling said conditioned received electrical analog signal and for converting said sampled signal to a digitally encoded word representative of said received electrical analog signal;

digital signal processing processor means coupled to said sampling means and having a preprogrammed instruction set for performing a predetermined number of frequency domain analyzations of each of said sampled digitally encoded words to detect the presence of a predetermined frequency, said digital signal processing processor further having means for identifying by time each of said frequency domain analyzed digitally encoded words, and means for identifying the one of said number of frequency domain analyzed digitally encoded words during which the presence of said predetermined frequency is detected to identify the time of detection; and computer means having a preprogrammed instruction set and being coupled to said digital signal processing processor means for calculating the real time difference between the time of detection and time of transmission whereby the real time difference is representative of the distance between the origination of the transmitted acoustic wave and said receiver means.

2. A digital range measurement system as defined in claim 1 wherein said digital signal processing processor means further includes means for generating a digitally encoded word representative of an analog electrical signal having a unique, characterizing frequency, means for converting said digitally encoded word to said analog electrical signal, means for conditioning and coupling said analog electrical to said transmitting means for transmission as an acoustic wave, said unique characterizing frequency identifying a specific digital range measurement system.

3. A digital range measurement system as defined in claim 2 wherein said computer means further includes delay characterizing information for the medium through which the transmitted acoustic wave travels for use by the instruction set in calculating the range between the transmitting means and the receiver means.

4. A digital range measurement system as defined in claim 1 wherein said digital signal processing processor means performs 64 Fast Fourier Transforms on said sampled digitally encoded words.

5. A digital range measurement system as defined in claim 4 wherein said computer means includes data storage means, said computer means causing all system information to be recorded at said data storage means at predetermined time intervals subsequent to transmitting said acoustic wave and for each instance that a detection is made.

* * * * *